US007366176B1

(12) United States Patent
Sundaresan et al.

(10) Patent No.: US 7,366,176 B1
(45) Date of Patent: Apr. 29, 2008

(54) METHOD TO PROVIDE EFFECTIVE CONNECTION GROOMING IN PNNI

(75) Inventors: Krishna Sundaresan, Sunnyvale, CA (US); Mahesh Chellappa, San Jose, CA (US); Chandrasekar Krishnamurthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 10/171,308

(22) Filed: Jun. 11, 2002

(51) Int. Cl.
*H04L 12/56* (2006.01)
*H04L 12/26* (2006.01)

(52) U.S. Cl. .............. 370/395.21; 370/238; 370/400; 370/409

(58) Field of Classification Search ............ 370/395.1, 370/395.2, 395.21, 395.3, 395.31, 395.32, 370/400, 409, 238, 410
See application file for complete search history.

(56) References Cited

U.S. PATENT DOCUMENTS

| | | | | |
|---|---|---|---|---|
| 4,679,189 A | * | 7/1987 | Olson et al. | 370/396 |
| 5,452,294 A | * | 9/1995 | Natarajan | 370/351 |
| 5,649,108 A | * | 7/1997 | Spiegel et al. | 709/241 |
| 5,781,529 A | * | 7/1998 | Liang et al. | 370/218 |
| 6,208,623 B1 | | 3/2001 | Rochberger et al. | |
| 6,272,139 B1 | | 8/2001 | Soncodi | |
| 6,473,408 B1 | | 10/2002 | Rochberger et al. | |
| 6,563,798 B1 | | 5/2003 | Cheng | |
| 6,597,689 B1 | | 7/2003 | Chiu et al. | |
| 6,600,724 B1 | | 7/2003 | Cheng | |
| 6,614,762 B1 | | 9/2003 | Illiadis et al. | |
| 6,618,381 B1 | * | 9/2003 | Miyamoto et al. | 370/395.43 |
| 6,741,585 B1 | * | 5/2004 | Munoz et al. | 370/352 |
| 6,778,496 B1 | * | 8/2004 | Meempat et al. | 370/230 |
| 6,781,952 B2 | | 8/2004 | Shirakawa | |
| 6,801,502 B1 | | 10/2004 | Rexford et al. | |
| 2001/0038631 A1 | | 11/2001 | Kim et al. | |

FOREIGN PATENT DOCUMENTS

WO WO 02/091670 A2 11/2002

OTHER PUBLICATIONS

The ATM Forum Technical Committee, "ATM User-Network Interface (UNI) Signaling Specification, Version 4.1," With Revision Marks Relative to af-sig-0061.000, XP002247682, ATM Forum document number af-sig-0061.001 (Apr. 2002).
PCT Notification of Transmittal of The International Search Report or The Declaration for PCT Counterpart Application No. PCT/US03/08785 Containing International Search Report (Jul. 28, 2003).
International Telecommunication Union (ITU), ITU-T, Q.2931. B-ISDN Application Protocols for Access Signaling (Feb. 1995).

* cited by examiner

*Primary Examiner*—Afsar Qureshi
(74) *Attorney, Agent, or Firm*—Blakely, Sokoloff, Taylor & Zafman LLP (57) ABSTRACT

A method to provide actual network connection routing cost for use in connection grooming is disclosed for one embodiment. A setup message is transmitted from a source network node, through one or more intermediate nodes, to a destination node. A connect message, in acknowledgement of the setup message, is transmitted from the destination node, through the one or more intermediate nodes, to the source node to establish a network connection. The connect message includes an actual routing cost field. For one embodiment, an actual routing cost field is carried in a generic application transport (GAT) information element (IE) of a PNNI CONNECT message. The actual routing cost field is updated at every node as each link is traversed from the destination node to the source node. The accumulated routing cost in the GAT IE represents the actual routing cost of the SPVC, which the source node uses for connection grooming.

17 Claims, 6 Drawing Sheets

METHOD TO PROVIDE EFFECTIVE CONNECTION GROOMING IN PNNI

FIELD

Embodiments of the present invention relate generally to digital communications networks and more specifically to network route optimization.

BACKGROUND

A digital network is comprised of a group of switches (nodes) that are connected to each other through a variety of interfaces. Asynchronous Transfer Mode ("ATM") or "cell switching" is a technology designed for transmitting digital information such as voice, video, and data at high speeds through the digital network. The digital information is segmented into cells (fixed-length packets) and transmitted from a source node through various intermediate nodes to a destination node. The path traversed through the network is known as a connection.

A digital network may employ virtual circuits that appear to be a discrete physical circuit dedicated to a particular user, but are actually a shared pool of circuit resources used to support multiple users. A permanent virtual circuit (PVC) is a continuously dedicated virtual circuit while a switched virtual circuit (SVC) is a temporary virtual circuit that may be dynamically established on demand, but is maintained only for the duration of a data transfer session. A hybrid of the PVC and the SVC is the soft permanent virtual circuit (SPVC) that has a PVC at the end points with a SVC within the network. This provides the user with the appearance and benefit of a PVC, but allows the network to intelligently reroute calls to accommodate node failures and optimize bandwidth utilization.

Figure 1:
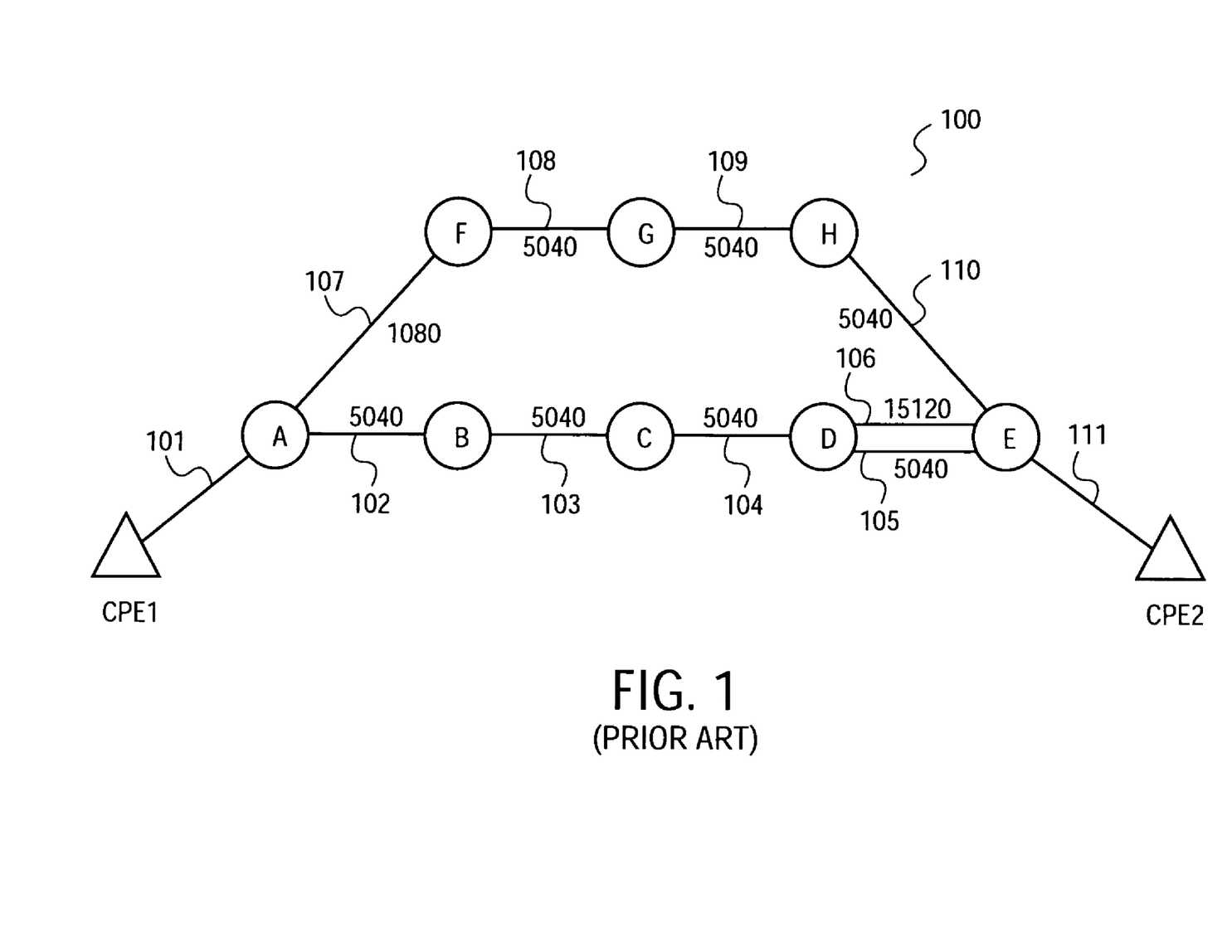
FIG. 1 illustrates an exemplary digital network in accordance with the prior art.

FIG. 1 illustrates an exemplary digital network in accordance with the prior art. Network 100 includes a plurality of nodes A-H that are interconnected by network connections (links) 101-111. The links transfer data from an originating customer-premise equipment (CPE) node CPE1 to a terminating CPE node CPE2. Each CPE node is terminating hardware such as a workstation, a computer, a server, or similar device that is owned by the user and not a service provider.

In general, the network 100 may include a variety of networks (e.g., ATM) coupling a plurality of users. Network 100 employs a SPVC so that network connections 101 and 111 are PVCs while the remaining connections are SVCs. A connection between users (or between particular nodes) may be established by traversing various combinations of intermediate nodes and links. For example, a connection between CPE1 and CPE2 may be comprised of nodes A-E and links 101-105 and 111 or may be comprised of nodes A, F, G, H, and E, and links 101 and 107-111.

A particular path is selected based upon a number of metrics including cell transfer delay (CTD), cell delay variation (CDV), and administrative weight (AW). These criteria are evaluated on a link-by-link basis, and totaled to determine a path cost. The CTD is the elapsed time between when a particular cell leaves a source node and when it enters a destination node. The CTD is the sum of the total inter-node transmission time and the total node processing time. The CDV is the variation of the CTD that may be induced by buffering and cell scheduling and is based on the probability of a cell arriving at a destination node later than expected. The AW is a weight for each link that may represent monetary cost, length of cable, direction of traffic, or other considerations or combinations thereof.

The routing protocol (e.g., Private Network to Network Interface (PNNI)) uses the metrics to route a call (establish a connection) based on a cost requirement. For example, some connections may have maximum CTD or CDV requirements.

The CTD and the CDV are link characteristics that are measured dynamically and continuously. The AW on the other hand is a static value determined by a network operator based on a number of criteria as discussed above and is not subject to continuous revision.

Currently, switches, such as the MGX 8850 switch available from Cisco Systems, Incorporated of San Jose, Calif., provide the capability of cost-based connection grooming (optimization) for SPVCs. The cost of the route will be the sum of the additive metrics on each link. For source routing protocols (e.g., PNNI), the routing cost of the SPVC is determined at the time of route selection itself. For example, referring again to FIG. 1, the cost of a connection from CPE1 to CPE2 is determined while routing the call initially so a connection over nodes A-E and links 101-105 is determined by adding the cost of each link over the round trip path for a total cost of 40320. Because this is less than the cost of a connection over nodes A, F, G, H, and E, and links 107-111 (50400), the connection will be routed over nodes A-E and links 101-105. During grooming, if a path is available with a better cost to route the SPVC, then the SPVC is torn down (terminated) and re-established on the current optimal route.

This method of path optimization has several disadvantages that may lead to routing a call over a less than optimal path. The source node cannot ascertain with certainty the actual connection that will be established due to dynamic routing in a SPVC. The source node therefore presumes a connection, evaluates its cost and compares this cost to other presumed connections. For example, in the case of crankback, where a call cannot proceed on a desired link (e.g., due to a dynamic link failure) the peer node will choose another link that goes to the desired node. For example, in FIG. 1, node D has two links that go to node E, namely links 105 and 106. If link 105 fails, the call proceeds over link 106. However, the source node (node A) that determines the cost at the time the call is set up does not become aware of this dynamic selection of links in a SPVC. As illustrated by FIG. 1, this may lead to a less than optimal path being selected as the cost of routing the call over nodes A-E and links 101-104 and 106 is 60480 which is higher than the cost of a connection over nodes A, F, G, H, and E, and links 107-111 (50400). Also, the source node calculates path cost based on AW, but doesn't have other information that an intermediate node may use to dynamically route a call. For example, even if link 105 is available, node D may choose to route the call over link 106 based on other criteria such as load balancing algorithms or bandwidth availability.

Additionally, the current method of path optimization poses an inherent problem in a PNNI multi-peer group network. In a PNNI network, the cost of each link is advertised in the link topology state element. The PNNI topology state element (PTSE) is a collection of information that is flooded among all logical nodes within a peer group. The PNNI protocol exchanges these PTSEs through database synchronization and those PTSEs will be available in all nodes within the same peer group. However the cost of a link is not known beyond its peer group. So, for a call that crosses two or more peer groups, the routing cost will not take into consideration the cost of the internal links within the other peer group. For example, nodes A, B, C, and F of FIG. 1 may constitute one peer group, and nodes D, E, G, and H may constitute another. In such a case the originating node, node A can calculate the partial path cost over nodes B and C and links 102 and 103, and can calculate the partial path cost over node F and link 107, but does not have sufficient information to calculate an end-to-end path between CPE1 and CPE2, and therefore cannot effect efficient grooming.

SUMMARY

A method to provide actual network connection routing cost is disclosed for one embodiment. A setup message is transmitted from a source network node, through one or more intermediate nodes, to a destination node. A connect message, in acknowledgement of the setup message, is transmitted from the destination node, through the one or more intermediate nodes, to the source node to establish a network connection. The connect message includes an actual routing cost field. The actual cost of traversing each intermediate node is automatically added to the actual routing cost field as the connect message traverses each intermediate node. The actual cost of the network connection is contained such in the actual routing cost field of the connect message when received by the source node.

Other features and advantages of embodiments of the present invention will be apparent from the accompanying drawings, and from the detailed description, that follows below.

BRIEF DESCRIPTION OF THE DRAWINGS

Embodiments of the present invention are illustrated by way of example, and not limitation, by the figures of the accompanying drawings in which like references indicate similar elements and in which.

DETAILED DESCRIPTION

A method for providing effective connection grooming is disclosed for one embodiment. An actual routing cost field is carried in a generic application transport (GAT) information element (IE) of a SPVC CONNECT message. The destination node will send the accumulated routing cost back to the source node in the GAT IE in a CONNECT message. The GAT IE carrying the actual routing cost field is updated at every node as each link is traversed from the destination node to the source node. The accumulated routing cost in the GAT IE represents the actual routing cost of the SPVC, which the source node uses for connection grooming.

Figure 2:
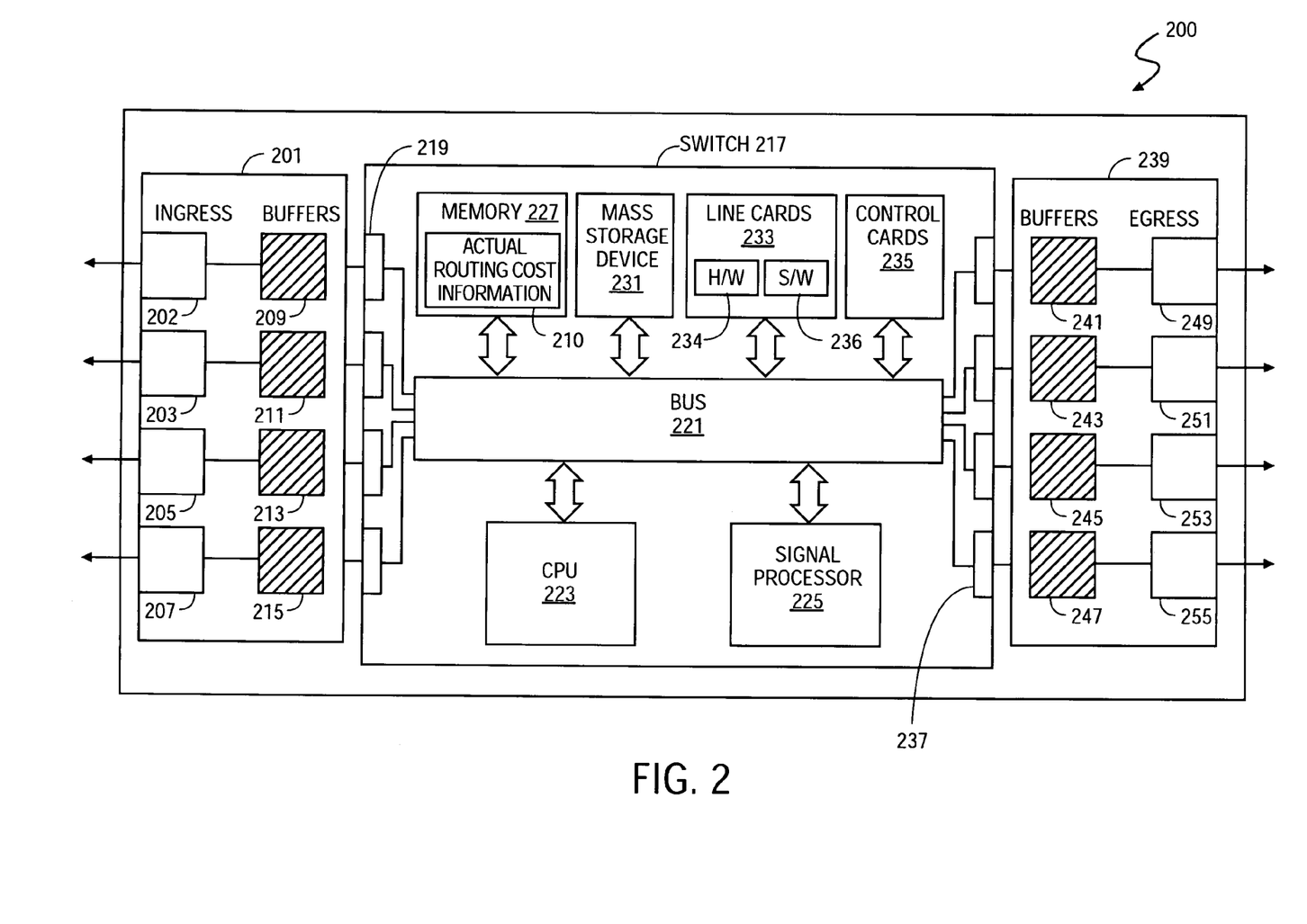
FIG. 2 illustrates an exemplary network node that may represent a source node, an intermediate node, or a destination node in accordance with one embodiment of the present invention.

FIG. 2 illustrates an exemplary network node that may represent a source node, an intermediate node, or a destination node in accordance with one embodiment of the present invention. Node 200 includes an ingress unit 201, a switch 217, and an egress unit 239. Ingress unit 201 may be coupled to input data links for receiving data from another network node via a trunk coupled to the node. Ingress unit 201 may include ingress input areas 202-207, and buffering units 209-215 coupled to the ingress areas 202-207 for buffering the received data from the input links. Ingress unit 201 may be coupled to switch 217 for transferring the buffered data to the switch 217.

Switch 217 is an ATM switch. Alternatively, other types of switches may also be used. ATM switch 217 is coupled to a variety of trunks—for example, OC48, OC12, or DS3 trunks. Switch 217 includes a digital processing system for processing data received by and to be sent by the network node. The digital processing system includes a bus 221 coupled to a plurality of input and output ports 219 and 237, a signal processor 225, a central processing unit ("CPU") 223, a memory 227, a mass storage device 231, a plurality of line cards 233, and a plurality of control cards 235.

For one embodiment, bus 221 is a standard system bus. CPU 223 and signal processor 225 can be used to process information and/or signals for switch 217. Signal processor 225 can be used to process speech or audio information and signals for speech processing and recognition.

Memory 227 can comprise dynamic random access memory ("DRAM") static random access memory ("SRAM"), read-only memory ("ROM"), or other storage devices, for storing data or program codes used by CPU 223 or signal processor 225. For example, memory 227 may store the actual routing cost information 210 to be processed by signal processor 225 or CPU 223. CPU 223 or signal processor 225 may execute code or executable instructions stored in a machine-readable medium, e.g., memory 227. The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media or flash memory devices. The code or executable instructions may be represented by carrier-wave signals, infrared signals, digital signals, and by other like signals.

Memory 227 may also store temporary variables or other intermediate information during execution of instructions by CPU 223 or signal processor 225. Mass storage device 231 can be a hard disk drive a floppy disk drive, an optical disk drive, or other mass storage device for storing information or instructions for the switch 217. For example, CPU 202 or signal processor 203 may execute code.

Switch 217 may contain four or more line cards 233 and several control cards 235 that control the line cards via bus 221. For one embodiment, the line cards 233 are coupled to four ports 219 and four ports 237 via bus 221. Each port may support a specific data bit rate. User traffic may be received through one line card and transmitted through another. This cross-connection is determined by a control card 235 upon the establishment of a connection. Typically, each line card also contains a hardware module 234 to accomplish bit-level and cell-level functions (such as recombining, quality of service, etc.) and a software module 236 for reprogramming hardware upon changing connections. The control cards 235 may typically run the various protocols, such as the PNNI protocol, and may contain datagrams for encapsulating resource configuration information within a user definable programmable data unit ("PDU") of a signaling protocol (e.g., the Service Specific Connection Oriented Protocol ("SSCOP")). Bus 221, CPU 223, signal processor 225, memory 227, mass storage device 231, line cards 233, and control cards 235 communicate to process PNNI packets received from input ports 219.

An egress unit 239 is coupled to switch 217. Egress unit 239 includes a series of buffers 241, 243, 245, and 247 coupled to a series of egress areas 249, 251, 253, and 255. The series of buffers 241, 243, 245, and 247 and egress areas 249, 251, 253, and 255 are selected by the switch 217 based on class of service. The egress unit 239 is coupled to output data links and data is communicated from these output data links to a node designated by the switch 217.

At the switch 217, data is received from the ingress unit 201 and a decision is made to route the data to a particular node. Further functions such as quality of service ("QOS") may be determined by switch 217. Each trunk coupled to the ATM switch 217 has a bandwidth capacity allocated to it. Switch 217 is coupled to a trunk and has a control plane and a data plane. The data plane can accommodate a fixed capacity of bandwidth that a trunk may carry. Thus, the amount of data that can be accommodated in a data plane of ATM switch 217 depends upon the size of the trunk coupled to the ATM switch.

Figure 3:
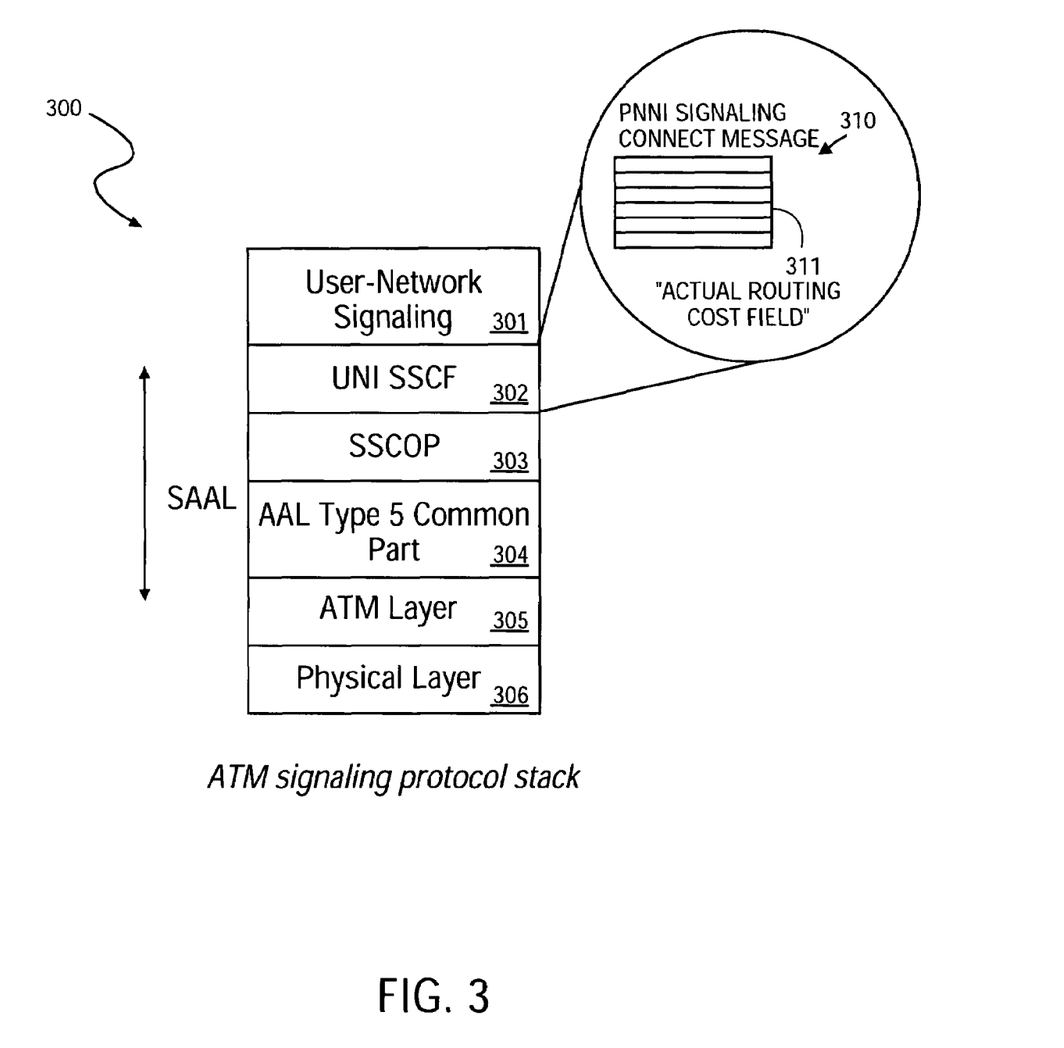
FIG. 3 is a diagram of an ATM signaling protocol stack in which embodiments of the present invention can be implemented.

FIG. 3 is a diagram of an ATM signaling protocol stack 300 in which embodiments of the present invention can be implemented. The ATM signaling protocol stack 300 is used for signaling information between nodes and users of an ATM network in accordance with embodiments of the present invention. Types of information exchanged in an ATM network may include requests for use of network resources, signaling messages, bandwidth allocation factors, and circuit parameters for establishing a SVPC between two users. A successful signaling exchange performed using the ATM signaling protocol stack 300 results in creation of a Virtual Path Identifier (VPI)/Virtual Channel Identifier (VCI) pair and allocation of requested bandwidth.

The ATM signaling protocol stack 300 includes several protocols for connection control signaling, such as User-Network Signaling 301, User Network Interface Service Specific Coordination Function ("UNI SSCF") 302, Service Specific Connection-Oriented Protocol ("SSCOP") 303, ATM Adaptation Layer ("AAL") Type 5 Common Part 304, ATM Layer 305, and a Physical Layer 306. These protocols are sent over a Signaling ATM Adaptation Layer ("SAAL") to ensure reliable delivery. The SAAL is divided into two parts—namely, a Service Specific Part and a Common Part.

The ATM layer 305 in the ATM signaling protocol stack 300 is used for establishing virtual connections between ATM nodes of a network. The ATM layer uses information contained in each ATM node for configuring the virtual connection. The configuration allows an ATM node to perform functions such as multiplexing and demultiplexing of ATM cells, translating VPI/VCI values, and header modifications. The physical layer 306 in the ATM network has several functions, including frame generation, cell delineation, and bit-level transmission.

The Service Specific Part of the SAAL of the ATM signaling protocol stack 300 includes UNI SSCF 302 and SSCOP 303. The UNI SSCF 302 includes PNNI signaling information.

As described above, PNNI is a hierarchical dynamic link state routing protocol. PNNI signaling may be used in a large scale ATM network having multiple hierarchical groups or in single peer groups with a local network. PNNI signaling protocol comprises procedures to dynamically establish, maintain, and clear ATM connections at a private network-to-network interface or a network node interface between two ATM networks or two ATM network nodes. The PNNI signaling protocol is based on the ATM Forum UNI specification and on the International Telecommunications Union ("ITU") Q.2931 specification, but there are some differences between PNNI and the UNI specification and Q.2931.

The UNI/PNNI signaling protocols interface with users of the SSCF protocol and SSCOP for reliable delivery of cells to users of a digital network. The UNI/PNNI protocols perform network signaling functions such as call establishment, call clearing, and negotiation and allocation of bandwidth. UNI/PNNI signaling may also be used to perform network signaling functions.

The PNNI signaling message types include call establishment messages, call clearing messages, miscellaneous messages, and point-to-multipoint messages. In particular, PNNI signaling message types include, among others, SETUP and CONNECT.

"SETUP" is one of the call establishment message types for PNNI signaling messages. The SETUP PNNI signaling message is sent by the calling user to the network and by the network to the calling user to initiate a call.

CONNECT is a call acknowledgement message. The CONNECT PNNI signaling message is sent by a destination node to the source node through the SPVC requested by the source node.

The PNNI signaling protocol SETUP message allows each ATM network node to dynamically establish a Virtual Circuit rather than manually configuring node by node. A source node transmits a SETUP message to a destination node. In acknowledgement, the destination node transmits a CONNECT message to the source node. For one embodiment of the invention, the CONNECT message 310, shown in FIG. 3, includes an actual routing cost field 311.

Figure 4:
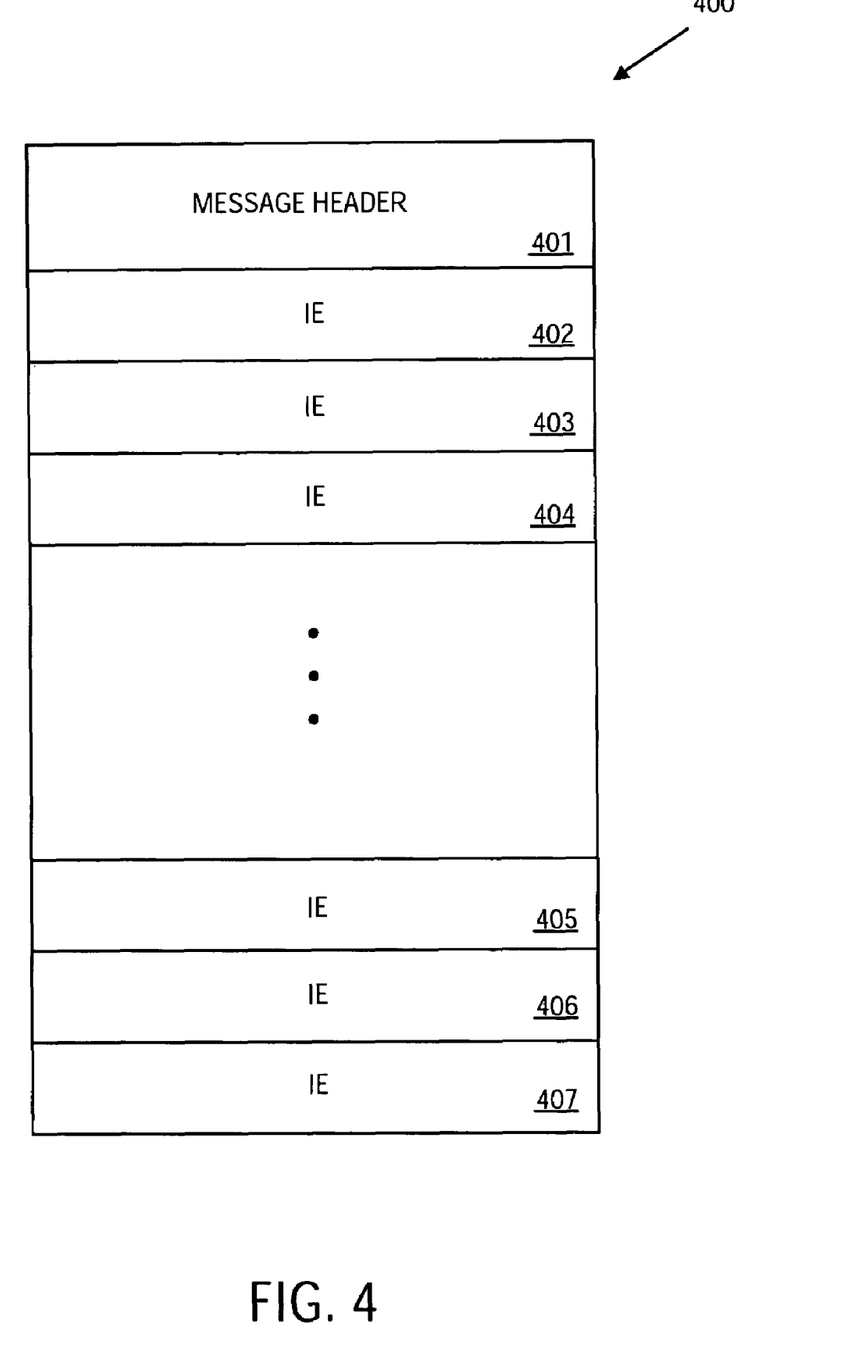
FIG. 4 illustrates the structure of a PNNI signaling message.

FIG. 4 illustrates the structure of a PNNI signaling message 400. The PNNI signaling message 400 is comprised of a message header 401 and a variable number of Information Elements ("IEs") 402 through 407. Although six IEs are shown in FIG. 4, more or fewer IEs could also be part of the PNNI signaling message 400.

The message header 401 contains information regarding the PNNI signaling message, such as a protocol discriminator, a call reference value, a message type, and a message length. For one embodiment, the message header 401 is 8 bits wide and contains a plurality of octets.

The SETUP message type is included in message header 401 for a SETUP PNNI signaling message. The CONNECT message type is included in message header 401 for a CONNECT PNNI signaling message.

The PNNI signaling message 400 includes information elements 402-407. There are several types of information elements. Some may appear only once in the message. Others may appear more than once. Depending on the message type, some information elements are mandatory and some are optional. The order of the information elements does not matter to the signaling protocol. Information elements include, but are not limited to, call state, connection identifier, quality of service parameter, calling party number, called party number, etc. For one embodiment, each of the information elements 402-407 is 8 bits wide and contains a plurality of octets.

For one embodiment of the invention, an actual routing cost field is transported between network nodes in a PNNI signaling CONNECT message. In particular, for one embodiment, the actual routing cost field is transported in a Generic Application Transport ("GAT") information element ("IE") that is part of the PNNI signaling CONNECT message. The GAT mechanism is an interoperable method for transporting non-PNNI native information in PNNI networks.

Figure 5:
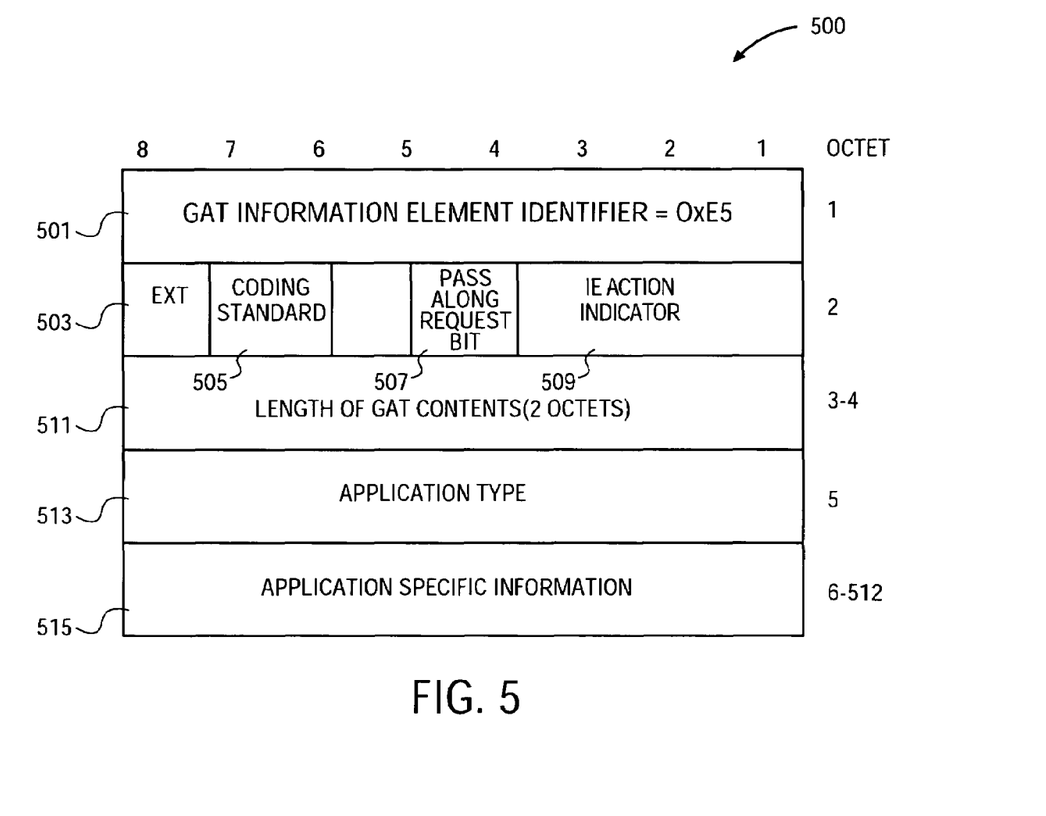
FIG. 5 relates to the embodiment of the invention wherein the actual routing cost field is transported in a generic application transport information element that is part of a PNNI CONNECT signaling message.

FIG. 5 relates to the embodiment of the invention wherein the actual routing cost field is transported in a GAT IE 500 that is part of a PNNI CONNECT signaling message. The GAT IE 500 would be one of the information elements 402 through 407 (shown in FIG. 4) used in a PNNI CONNECT signaling message as described in reference to FIG. 4.

The GAT IE 500 is 8 bits wide and has 512 octets. The GAT IE 500 includes a GAT IE identifier 501, an extension field 503, a coding standard 505, a pass along request bit 507, an IE action indicator 509, a length field 511, an application type field 513, and application specific information 515.

The GAT IE identifier 501 allows a node to recognize the information being sent in the packet 500 and is in the first octet field of the GAT IE 500.

Coding standard 505 specifies the type of coding used to format the GAT IE 500. The pass along request bit 507 allows a node to pass along the GAT IE 500 instead of dropping the IE 500 if the node receiving the GAT IE 500 does not recognize the coding standard 505 of GAT IE 500. For example, GAT IE 500 may be coded in an interoperable coding standard 505 such that an ATM network node that does not support or understand the GAT IE 500 will not reject the GAT IE 500, but instead will simply pass the GAT IE 500 along to the next ATM network node in the transmission path.

The IE action indicator 509 suggests the actions that may be taken by a node receiving the GAT IE 500, such as to accept and implement the parameters of the IE 500 or simply forward the IE 500. Extension 503, coding standard 505, pass along request bit 507, and IE action indicator 509 are in the second octet of GAT IE 500.

The GAT IE 500 also includes a field 511 for length of the GAT contents, an application type field 513, and an application specific information field 515. The GAT field 511 occupies the third and fourth octets. The application type field 513 is the fifth octet of IE 500. The application type field 513 can be organization specific and is coded as Ø×Ø. The application specific information field 515, which occupies octets 6 through 512, may include specific information requested or desired by the users of the network, including the actual routing cost field in accordance with an embodiment of the present invention.

When application type field 513 is organization specific, then application specific information field 515 of FIG. 5 will include an organization unique identifier ("OUI") field. This allows switches produced by a specified vendor to use the actual routing cost information, while other vendors simply pass the information on. That is, because the actual routing cost is conveyed using standard PNNI signaling capability, it is interoperable with the PNNI protocol implementation from other vendors. The PNNI implementation from other vendors will not interpret the actual routing cost information but will transport the information transparently.

Figure 6:
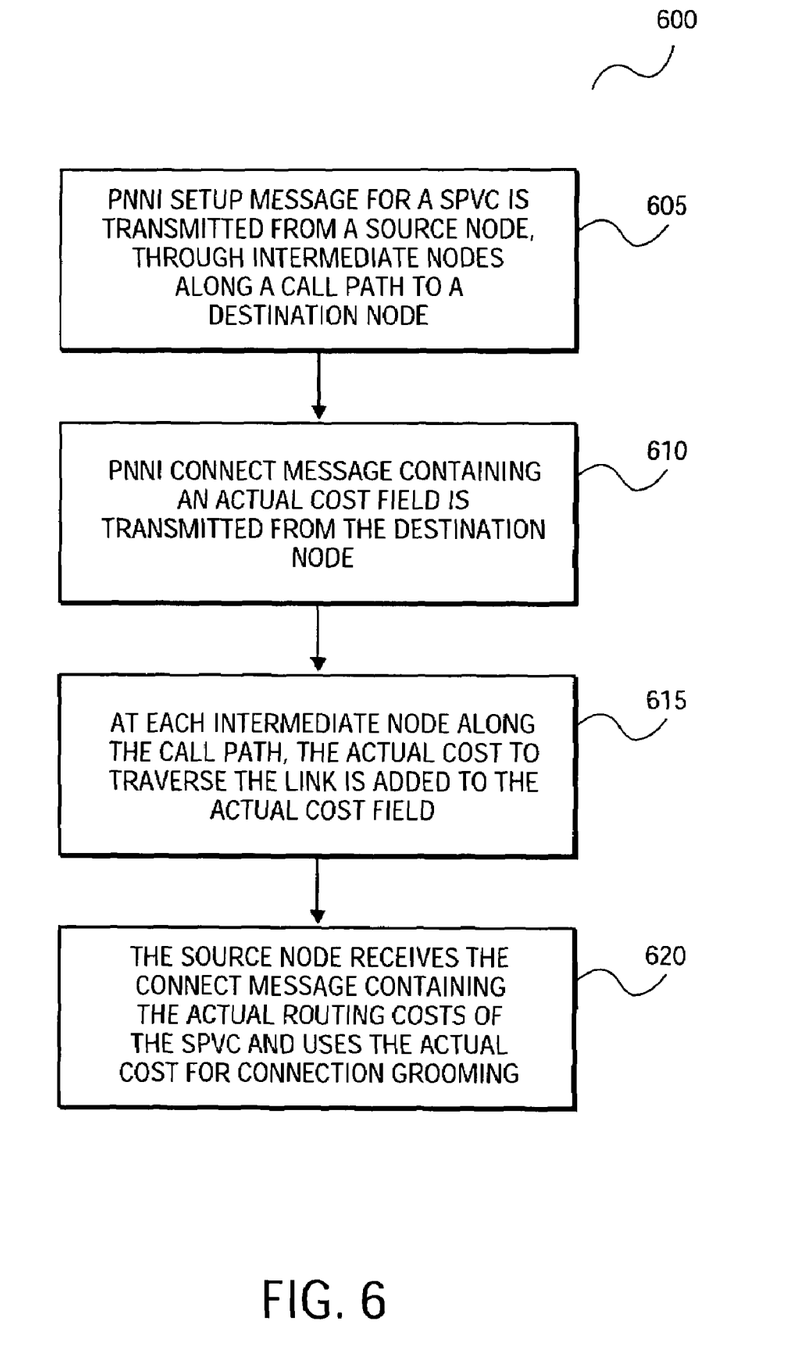
FIG. 6 is a process flow diagram in accordance with one embodiment of the present invention.

FIG. 6 is a process flow diagram in accordance with one embodiment of the present invention. Process 600 begins with operation 605 in which a PNNI SETUP message for a SPVC is transmitted from a source node, through intermediate nodes along a call path to a destination node. The call path, which may extend through two or more peer groups may be chosen based upon what is known by the source node in regard to the total AW associated with the path. When the SETUP message arrives at the destination node, the actual path taken for the SPVC is known.

At operation 610 the destination node transmits a PNNI CONNECT message (a call request acknowledgement) back along the path to the source node. The CONNECT message contains an actual routing cost field.

At operation 615 each intermediate node updates the actual routing cost field of the CONNECT message with the actual cost for traversing the link. Therefore, if due to crankback, a node routes a call through a different node than the one specified by the source node, the actual cost of the new route will get accumulated in the actual routing cost field. As discussed above, the actual cost is the cumulative cost of transmission across each link (forward and backward cost for round-trip transmission). For one embodiment the value added to the actual cost field may be calculated using the forward and the backward cost to account for round-trip transmission.

At operation 620 the CONNECT message is received at the source node. The source node now has access to the actual cost of the SPVC. The actual cost may now be used for efficient connection grooming. During grooming, the source node will be comparing the actual cost of the SPVC rather than the cost perceived by the source node. In the multi-peer group PNNI implementation, the actual routing cost of the SPVC will be used in conjunction with the complex node representation for effective connection grooming. The cost between two border nodes is advertised in a complex node representation by the logical nodes as the nodal state parameter IG PTSEs. For the purpose of connection grooming, the source node receiving this PTSE can compare the actual cost taken by the SPVC (the cost received in the actual routing cost field of the CONNECT message) to the cost within the peer group and the cost of the other peer groups in the nodal state parameter PTSE.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   receiving a PNNI CONNECT message, having an actual routing cost field, the actual routing cost field is part of a generic application transport (GAT) information element (IE), the GAT IE part of a PNNI signaling message, at an intermediate node of a network connection, the PNNI CONNECT message transmitted from a destination node along a known path, through one or more intermediate nodes, back along a path to a source node to establish the network connection;
   adding the actual routing cost to traverse the intermediate node to the actual routing cost field of the PNNI CONNECT message; and
   forwarding the PNNI CONNECT message back along the path to the source node.

2. The method of claim 1 further comprising:
   using the actual cost of the network connection for connection grooming.

3. The method of claim 2, wherein the network connection is a soft permanent virtual connection (SPVC).

4. The method of claim 3, wherein the one or more intermediate nodes are distributed among more than one peer group.

5. The method of claim 2, wherein connection grooming further comprises:
comparing the actual cost of the network connection with a cost of a presumed connection; and
terminating the network connection and establishing the presumed connection between the source node and the destination node if the actual cost of the network connection is greater than the cost of the presumed connection by a specified amount.

6. A computer-readable storage medium that stores executable instructions which, when executed by a processor, cause the processor to perform a method, the method comprising:
a) receiving a PNNI CONNECT message, having an actual routing cost field, the actual routing cost field is part of a generic application transport (GAT) information element (IE), the GAT IE part of a PNNI signaling message, at an intermediate node of a network connection, the PNNI CONNECT message transmitted from a destination node along a known path, through one or more intermediate nodes, back along a path to a source node to establish the network connection;
b) adding the actual routing cost to traverse the intermediate node to the actual routing cost field of the PNNI CONNECT message; and
c) forwarding the PNNI CONNECT message back along the path to the source node.

7. The computer-readable storage medium of claim 6, the method further comprising:
using the actual cost of the network connection for connection grooming.

8. The computer-readable storage medium of claim 7, wherein connection grooming includes:
comparing the actual cost of the network connection with a cost of a presumed connection; and
terminating the network connection and establishing the presumed connection between the source node and the destination node if the actual cost of the network connection is greater than the cost of the presumed connection by a specified amount.

9. The computer-readable storage medium of claim 8, wherein the one or more intermediate nodes are distributed among more than one peer group.

10. A switch for a digital network, comprising:
a memory; and
a processor coupled to the memory, the processor to automatically accumulate actual routing cost information of a network connection traversing the switch by accumulating the actual routing cost information to an actual routing cost field and to store the actual routing cost information in the memory, the actual routing cost field is part of a generic application transport (GAT) information element (IE), the GAT IE part of a PNNI signaling message, transported in a signaling message of a standards based signaling protocol being routed back along a path to a source node.

11. The switch of claim 10, wherein the actual cost of the network connection is used for connection grooming.

12. The switch of claim 10, wherein the standards based signaling protocol is a private network-to-network interface (PNNI) protocol.

13. A network system comprising:
means for receiving a PNNI CONNECT message, having an actual routing cost field, the actual routing cost field is part of a generic application transport (GAT) information element (IE), the GAT IE part of a PNNI signaling message, at an intermediate node of a network connection the PNNI CONNECT message transmitted from a destination node, through one or more intermediate nodes, back along a path to a source node along a known path,
means for adding the actual routing cost to traverse the intermediate node to the actual routing cost field of the PNNI CONNECT message; and
means for forwarding the PNNI CONNECT message back along the path to the source node.

14. The network system of claim 13, wherein transmitting the connect establishes the network connection such that the PNNI CONNECT message, received by the source node contains, in the actual routing cost field, the actual cost of the network connection.

15. The network system of claim 14 further comprising:
means for using the actual cost of the network connection for connection grooming.

16. An apparatus comprising:
a network node having a processor and a memory coupled to the processor, the memory storing actual routing cost information and executable instructions which when executed by the processor cause the processor to receive a PNNI CONNECT message, having an actual routing cost field, the actual routing cost field is part of a generic application transport (GAT) information element (IE), the GAT IE part of a PNNI signaling message, use the actual routing cost information to add the actual routing cost to traverse the network node to the actual routing cost field, and forward the PNNI CONNECT message back along a known path, to a source node.

17. The apparatus of claim 16, wherein the PNNI CONNECT message is transmitted from a destination node, through one or more intermediate network nodes, to a source node to establish the network connection such that the PNNI CONNECT message, received by the source node contains, in the actual routing cost field, the actual cost of the network connection.

* * * * *